UNITED STATES PATENT OFFICE.

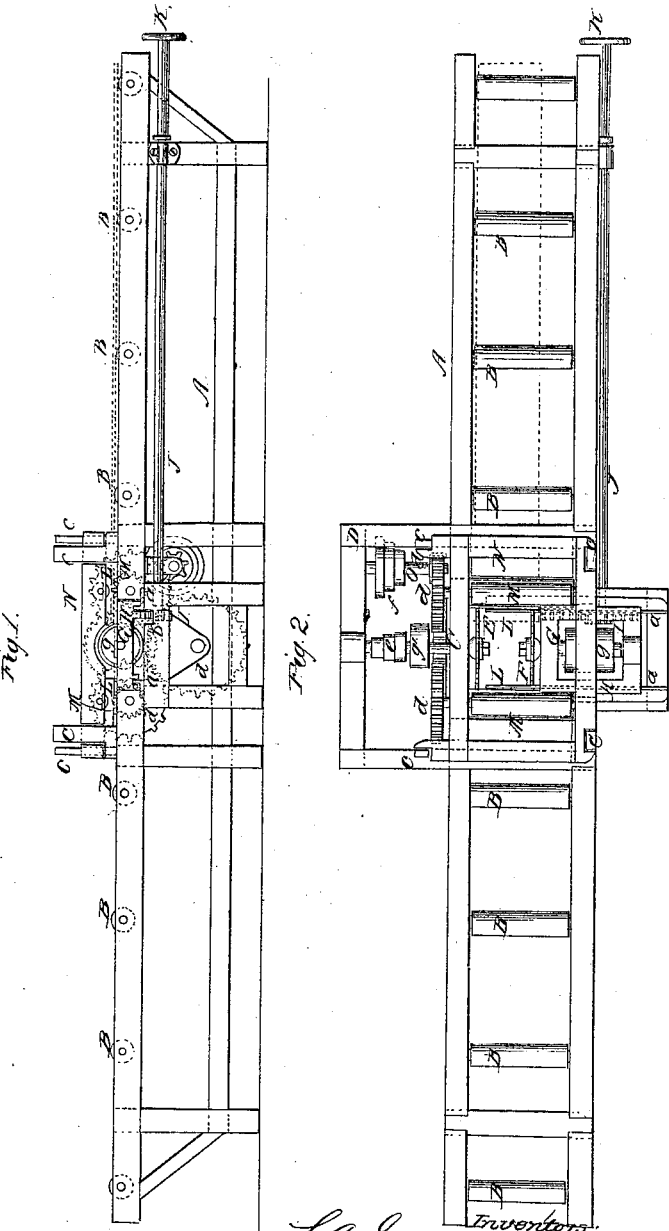

L. A. ENSWORTH AND B. BARKER, OF WILLIAMSPORT, PENNSYLVANIA.

IMPROVED MACHINE FOR EDGING LUMBER.

Specification forming part of Letters Patent No. 37,496, dated January 27, 1863.

*To all whom it may concern:*

Be it known that we, L. A. ENSWORTH and B. BARKER, both of Williamsport, in the county of Lycoming and State of Pennsylvania, have invented a new and Improved Machine for Edging Lumber—that is to say, for cutting or trimming the edges or sides of the same so that it will be of equal width throughout its entire length; and we do hereby declare that the following is a full, clear, and exact description of the same, reference being had to the accompanying drawings, making a part of this specification, in which—

Figure 1 is a side view of our invention. Fig. 2 is a plan or top view of the same.

Similar letters of reference indicate corresponding parts in the two figures.

To enable those skilled in the art to fully understand and construct our invention, we will proceed to describe it.

A represents a frame, in the upper part of which there is placed transversely a series of rollers, B, and C is an arbor, the inner bearing of which is in the frame A, the outer bearing being in a supplemental frame, D, attached to A. The arbor C has a circular saw, E, upon it, which is near one side of the frame A, as shown clearly in Fig. 2. The arbor C works in stationary bearings, and the saw E is what is commonly termed a "stationary" one, it having a rotary motion only.

F is a circular saw, which is placed on an arbor, G, fitted in a frame, H. This frame H is fitted on ways $a$ $a$, that are placed transversely in position with the frame A, as shown in Fig. 2, and to the under surface of the frame H, at one side, there is attached, longitudinally, a rack, $b$, into which a pinion, I, gears, said pinion being on a shaft, J, which extends along at one side of the frame A, and has a hand-wheel, K, on its outer end. The arbor G of the saw F is in line with the arbor C of the stationary saw E, and it will be seen that by turning the shaft J the frame H will be moved on its ways $a$ $a$ through the medium of the pinion I and rack $b$, and the saw F adjusted nearer to or farther from the saw E, as may be desired.

L L are two fluted rollers, which are placed on the frame parallel with the rollers B, and one at each side of the saws E F—that is to say, one in front and the other behind them—and M M are two pressure-rollers, which are fitted in a frame, N, that is placed within vertical guides $c$. The rollers M M have smooth peripheries, and they are directly over the fluted rollers L L, but do not rest upon them, the former bearing upon the lumber or work to be edged or trimmed. The fluted rollers are rotated by means of gearing $d$, from a shaft, O, which is rotated from the arbor C of the saw E by means of a belt passing around differential pulleys $e f$ on the saw-arbor C and shaft O. The saw F is driven by a belt passing around a pulley, $g$, on the arbor G, and the saw E is driven by a belt passing around a pulley, $g'$, on arbor C.

The operation will be readily seen. The lumber (shown in red) is placed between the front fluted roller, L, and front pressure-roller, M, and is fed along by the rollers L M on the roller B, and between the saws E F, the latter being adjusted to suit the width of the lumber. The saws trim the edges of the lumber so that it will be of equal width throughout its entire length. The lumber may be taken away from the discharge-end of the machine by an attendant, one operator only being required at the feed end, who, beside feeding the lumber to the machine, adjusts the saw F as the width of the lumber requires. The pressure-rollers M M are allowed to rise and fall freely to suit the thickness of the lumber, the frame N being allowed to work freely up and down within the vertical guides $c$.

The arrangement of the saws upon two independent arbors, with open space between, presents facilities for the convenient removal of either of the saws for sharpening, &c., without disturbing any of the other parts of the machine.

The use of the rack and pinion for moving the frame of the saw F affords an almost instantaneous means of adjusting the position of said saw to suit the varying width of the boards that are to be trimmed.

Having thus described our invention, what we claim as new, and desire to secure by Letters Patent, is—

1. The arrangement of the two saws E F upon independent arbors C G, placed upon the same plane, opposite to each other, with an open space between them, the saw F being made laterally adjustable, all as herein shown and described.

2. The combination of the two independent saws and arbors with the adjustable frame H, rack $b$, pinion I, frame N, and rollers L L M, all in the manner herein shown and described.

L. A. ENSWORTH.
BENJ. BARKER.

Witnesses:
B. S. DUNN,
G. BEDELL MONE.